(12) United States Patent
Oh et al.

(10) Patent No.: US 10,917,045 B2
(45) Date of Patent: Feb. 9, 2021

(54) DEPLOYMENT TEST APPARATUS OF A FOLDED SOLAR PANEL

(71) Applicant: Korea Aerospace Research Institute, Daejeon (KR)

(72) Inventors: Shi Hwan Oh, Daejeon (KR); Hong Youl Moon, Daejeon (KR)

(*) Notice: Subject to any disclaimer, the term of this patent is extended or adjusted under 35 U.S.C. 154(b) by 190 days.

(21) Appl. No.: 16/191,635

(22) Filed: Nov. 15, 2018

(65) Prior Publication Data

US 2019/0199283 A1 Jun. 27, 2019

(30) Foreign Application Priority Data

Dec. 22, 2017 (KR) .................. 10-2017-0178301

(51) Int. Cl.
| | | |
|---|---|---|
| *F24S 40/90* | (2018.01) | |
| *G01L 5/24* | (2006.01) | |
| *G01M 13/027* | (2019.01) | |
| *H02S 50/10* | (2014.01) | |
| *B64G 1/22* | (2006.01) | |

(52) U.S. Cl.
CPC .............. *H02S 50/10* (2014.12); *F24S 40/90* (2018.05); *G01L 5/24* (2013.01); *G01M 13/027* (2013.01); *B64G 1/222* (2013.01); *F24S 2201/00* (2018.05)

(58) Field of Classification Search
None
See application file for complete search history.

(56) References Cited

U.S. PATENT DOCUMENTS

| | | | | |
|---|---|---|---|---|
| 6,010,096 A | * | 1/2000 | Baghdasarian | ........ B64G 1/222 160/135 |
| 7,644,890 B2 | * | 1/2010 | Quincieu | ............... B64G 1/222 244/172.6 |
| 8,683,755 B1 | * | 4/2014 | Spence | .................. B64G 1/443 52/108 |
| 9,496,621 B2 | * | 11/2016 | Meschini | ............... B64G 1/222 |
| 10,541,643 B2 | * | 1/2020 | Knox | ...................... F24S 23/74 |

FOREIGN PATENT DOCUMENTS

| | | |
|---|---|---|
| KR | 20100059576 A | 6/2010 |
| KR | 20110058447 A | 6/2011 |
| KR | 101437875 B1 | 9/2014 |

OTHER PUBLICATIONS

Moon, Hong Youl et al.;Design of Solar Array Deployment Test Equipment; KSAS 2017 Fall Conference.

\* cited by examiner

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

Provided is a deployment test apparatus including a fixing frame configured to fix a first portion of a target object in which the first portion is hingedly coupled to a second portion, a rotation axis module including a rotary shaft and disposed on one side of the fixing frame, a rotary arm radially extending from the rotary shaft in an upper portion of the fixing frame, and a support module connected to the rotary arm to clamp the second portion of the target object to be floated, wherein when deploying the target object, the deployment test apparatus is configured to reduce an external force applied to the target object.

9 Claims, 8 Drawing Sheets

FIG. 7B

DEPLOYMENT TEST APPARATUS OF A FOLDED SOLAR PANEL

CROSS-REFERENCE TO RELATED APPLICATION(S)

This application claims the priority benefit of Korean Patent Application No. 10-2017-0178301 filed on Dec. 22, 2017, in the Korean Intellectual Property Office, the disclosure of which is incorporated herein by reference for all purposes.

BACKGROUND

1. Field

One or more example embodiments relate to a deployment test apparatus for performing a deployment test of a solar panel and, more particularly, to a deployment test apparatus for providing a simulation environment to predict a solar panel deployment on an orbit without gravity or air resistance.

2. Description of Related Art

Generally, a satellite is transported to space by a launch vehicle with a minimized volume to be inserted on an orbit. By deploying a folded solar panel after separation from the launch vehicle, a required power is provided to the satellite.

An on-orbit satellite is free from the gravitational force. Thus, an on-ground environment similar to a zero gravity environment of the space may be required to test a function and performance of the deployment of solar panel during the ground test period.

Also, in order to perform the deployment test of the solar panel for the satellite on the ground, the deployment test apparatus may reduce influences of the gravity, the air resistance, and other external forces exerted on the solar panel due to the deployment test apparatus.

A typical solar panel deployment test apparatus may use a method of measuring a moment of a recently used tape spring hinge, which is disclosed in Korean Patent Application No. 10-2013-0094507.

SUMMARY

An aspect provides a deployment test apparatus that improves a performance test accuracy of a solar panel deployment hinge by reducing an influence of gravity on the ground so as to simulate a zero gravity environment on an orbit.

An aspect provides a deployment test apparatus in which an influence of air resistance is reduced so as to simulate a development motion of a solar panel on an orbit on the ground, thereby improving a performance test accuracy of a solar panel deployment hinge.

An aspect provides a deployment test apparatus in which a performance test accuracy of a solar panel deployment hinge is improved by reducing an external force such as a mass or drag force of the deployment apparatus to simulate a deployment motion of the solar panel on an orbit.

An aspect provides a deployment test apparatus for precisely predicting an actual trajectory of solar panel that occurs when a solar panel is deployed on an orbit.

An aspect provides a deployment test apparatus having a rotary shaft configured to move in accordance with a deployment axis movement of a solar panel.

An aspect provides a deployment test apparatus that requires a low manufacturing cost and is readily manufactured and installed with less restrictions on location for a test.

An aspect provides a deployment test apparatus having a high mobility and ease of use.

According to an aspect, there is provided a deployment test apparatus including a fixing frame configured to fix a first portion of a target object in which the first portion is hingedly coupled to a second portion, a rotation axis module including a rotary shaft and disposed on one side of the fixing frame, a rotary arm radially extending from the rotary shaft in an upper portion of the fixing frame, and a support module connected to the rotary arm to clamp the second portion of the target object to be floated, wherein when deploying the target object, the deployment test apparatus is configured to reduce an external force applied to the target object.

The deployment test apparatus may further include a horizontal compensation module connecting the support module and the rotary arm, wherein the horizontal compensation module may include a guide bar connected to the rotary arm and a horizontal bearing assembly connected to the support module and configured to move along the guide bar, and the support module may be allowed to move along the guide bar in a longitudinal direction of the rotary arm such that the second portion radially moves in response to the target object being deployed.

The horizontal compensation module may further include a horizontal adjustment member configured to adjust the guide bar to be level.

The horizontal compensation module may include a horizontal scale configured to indicate a displacement of the support module or the rotation axis module may include a rotary scale configured to indicate a displacement of the rotary shaft.

The rotation axis module may include a first self-aligning bearing. The first self-aligning bearing may include a bearing element configured to enclose the rotary shaft, a housing disposed to be spaced apart from the bearing element, and a plurality of vertical adjustment elements arranged to penetrate the housing in a radial direction of the rotary shaft such that the bearing element is spaced apart from the housing. The vertical adjustment elements may be configured to adjust a distance between the housing and the bearing element such that the rotary shaft is disposed in parallel to a gravity direction.

The rotation axis module may further include a second self-aligning bearing configured to enclose a lower portion of the rotary shaft to prevent a horizontal movement of the rotary shaft and a rotation sensing member configured to sense a quantity of rotation angle or an angular velocity of the rotary shaft.

The support module may include a clamping member configured to clamp the second portion and a rotation bearing configured to allow the second portion to rotate in response to the target object being deployed.

The support module may include a length adjustable member configured to be adjusted in length, a weight sensing member configured to sense a weight of the second portion, and a spring configured to allow the second portion to vertically move in response to the target object being deployed. A length of the support module may be adjusted based on a change in length of the length adjustable member such that an elevation height of the second portion of the target object is adjusted.

The deployment test apparatus may further include a horizontal adjustment cable configured to perform leveling to prevent the rotary arm from tilting, wherein the horizonal adjustment cable further may include a wire diagonally connecting the rotary arm and the rotary shaft and a wire length adjusting member configured to adjust a length of the wire.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 1:
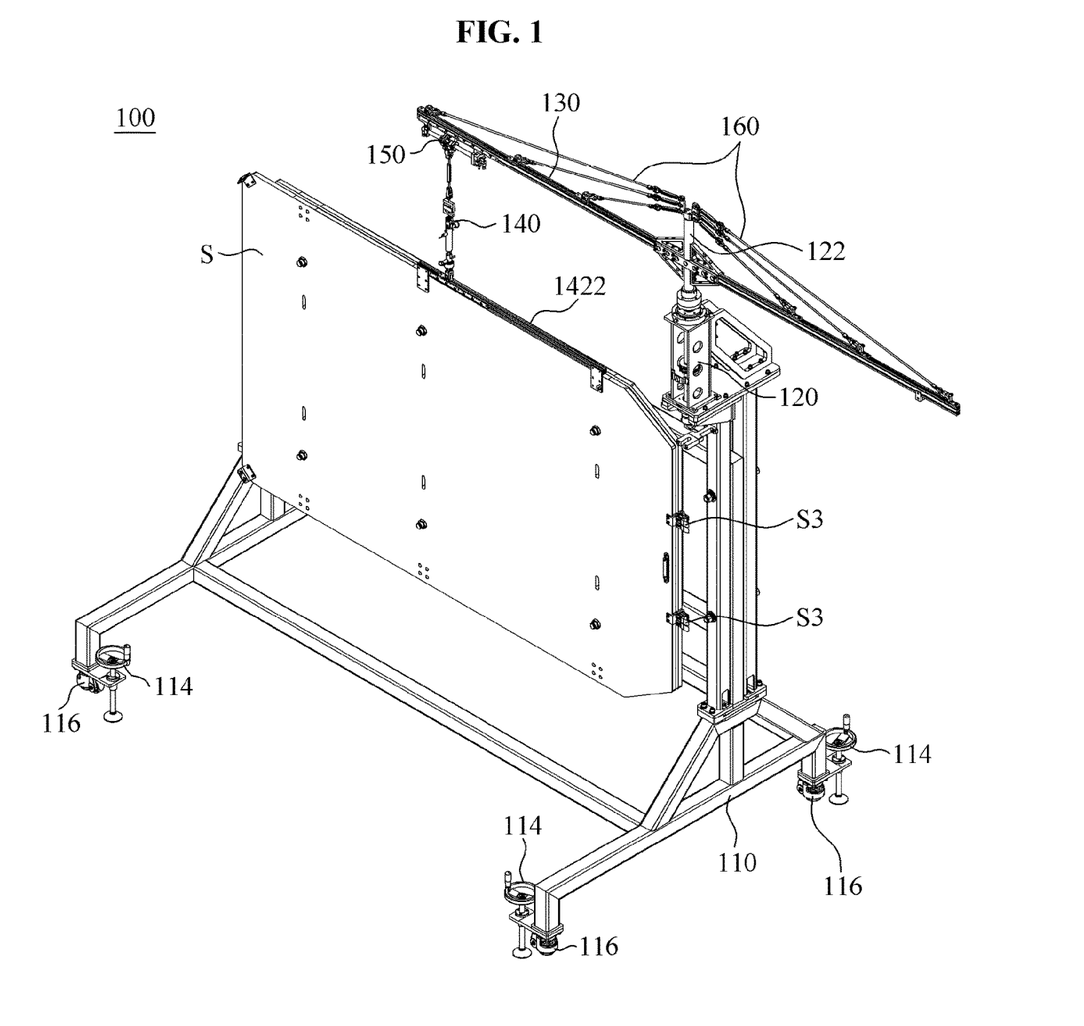
FIG. 1 is a perspective view illustrating a deployment test apparatus and a solar panel folded and installed in the deployment test apparatus according to an example embodiment.
Figure 2:
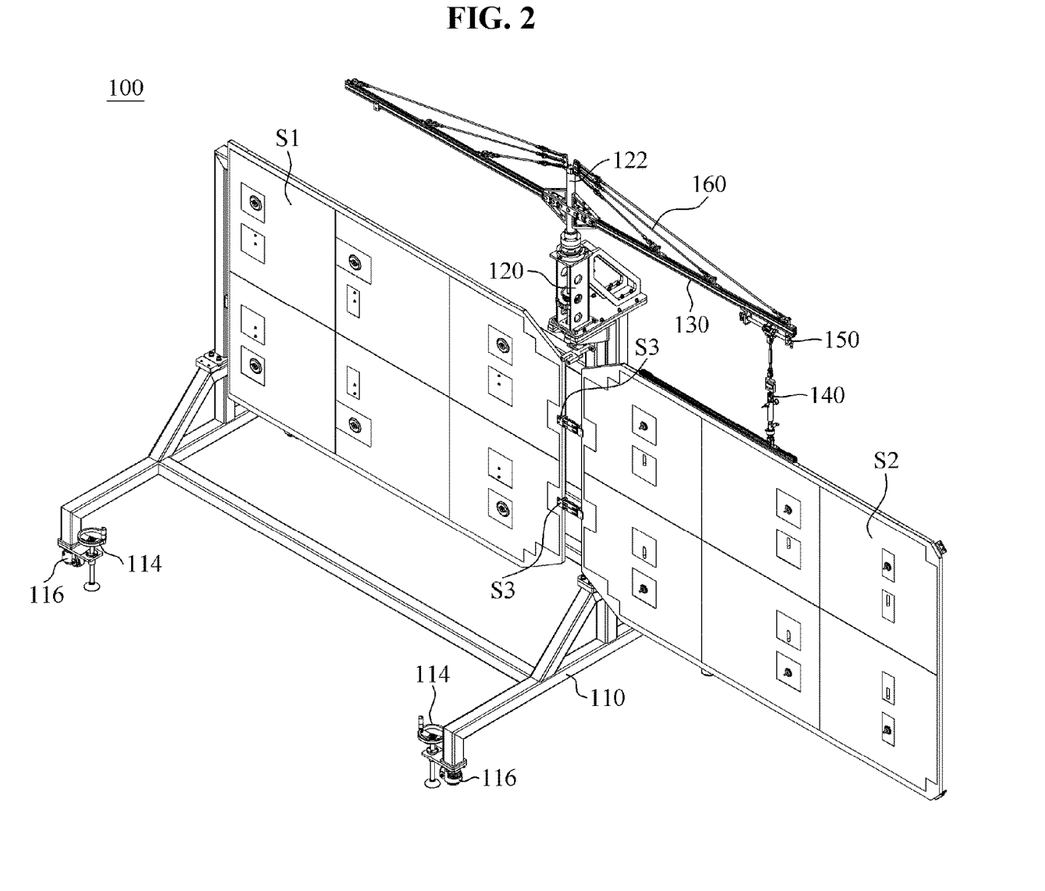
FIG. 2 is a perspective view illustrating a deployment test apparatus and a solar panel unfolded and installed in the deployment test apparatus according to an example embodiment.
Figure 3:
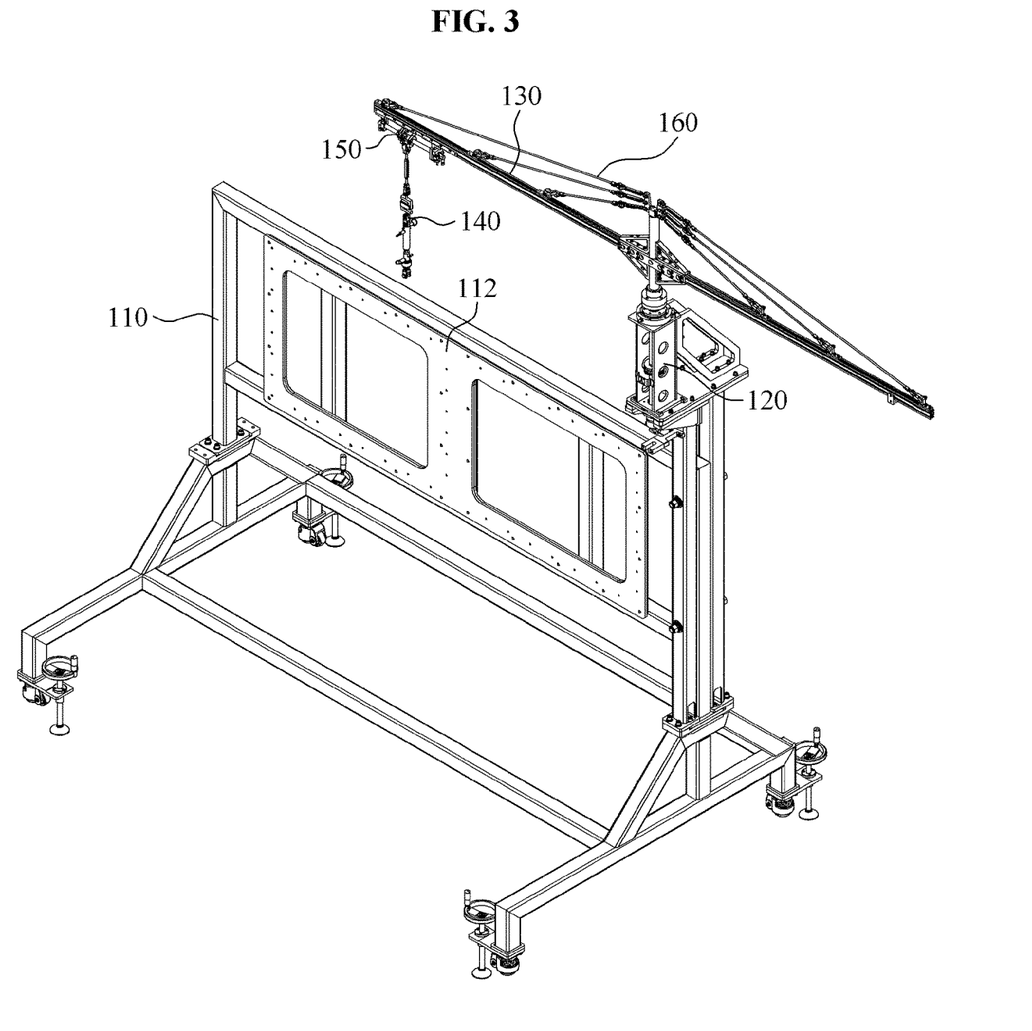
FIG. 3 is a perspective view illustrating a deployment test apparatus according to an example embodiment.

FIG. 1 is a perspective view illustrating a deployment test apparatus 100 and a solar panel S folded and installed in the deployment test apparatus 100 according to an example embodiment, FIG. 2 is a perspective view illustrating the deployment test apparatus 100 and the solar panel unfolded and installed in the deployment test apparatus 100 according to an example embodiment, and FIG. 3 is a perspective view illustrating the deployment test apparatus 100 according to an example embodiment.

Referring to FIGS. 1 and 2, the solar panel S may be installed in the deployment test apparatus 100. The solar panel S used for a deployment test may include a first portion S1 and a second portion S2, for example, two panel-shaped solar cells for ease and convenience of the deployment test. The first portion S1 and the second portion S2 of the solar panel S may be connected to a hinge S3 that deploys the first portion S1 and the second portion S2 to be aligned in series when the solar panel S is folded. Although the solar panel S is described as a target object S and the hinge S3 is described as a tape hinge S3 or a tape spring hinge S3 in the following description and the drawings, embodiments are not limited thereto.

Referring to FIGS. 1 through 3, the deployment test apparatus 100 may include a fixing frame 110, a rotation axis module 120, a rotary arm 130, a support module 140, a horizontal compensation module 150, and a horizontal adjustment cable 160.

The fixing frame 110 may support and fix the first portion S1 such that the first portion S1 of the solar panel S in a folded state is spaced apart from a ground. The fixing frame 110 may fix the first portion S1 such that the first portion S1 and the tape hinge S3 connected to the first portion S1 are installed horizontally with the ground. Also, the fixing frame 110 may prevent a movement of the first portion S1 during deployment test.

The fixing frame 110 may have a fixing plate 112 for clamping the first portion S1 to stably support the first portion S1. A plurality of legs may be provided at a lower portion of the fixing frame 110 to prevent a movement of the fixing frame 110 which may occur due to a deployment impact of the solar panel S. Also, at the lower portion of the fixing frame 110, wheels 116 may be provided to facilitate the movement of the fixing frame 110 and a plurality of stoppers 114 may be provided to prevent the movement of the fixing frame 110.

As illustrated in FIGS. 1 through 3, the stoppers 114 may be arranged around the wheels 116, each of the stoppers 114 may lift the fixing frame 110 through rotation such that the wheels 116 are lifted from the ground. Each of the stoppers 114 may be disposed at each lower corners of the fixing frame 110 to adjust a level of the fixing frame 110 through the rotation.

For example, the first portion S1 and the tape hinge S3 may be horizontal with the ground and perpendicular to a direction of gravity. In this example, when the first portion S1 and the tape hinge S3 are misaligned, weights of the first portion S1 and the second portion S2 may be added to the tape hinge S3, which may distort a deployment test result.

Thus, the stoppers 114 may adjust the level of the fixing frame 110 such that the tape hinge S3 and the first portion S1 fixed to the fixing frame 110 are horizontal with the ground, for example, perpendicular to the direction of gravity.

The rotation axis module 120 may be disposed on one side of the fixing frame 110 and include a rotary shaft 122. The rotary shaft 122 may be disposed to be parallel with the direction of gravity and a deployment axis of the solar panel S.

The rotary shaft 122 may extend in an upward direction. The rotary arm 130 may be disposed to extend in a radial direction of the rotary shaft 122. The rotary arm 130 may protrude horizontally with the ground and be formed on a lightweight material to reduce a resistance occurring due to the rotary arm 130 when the second portion S2 is deployed.

The horizontal compensation module 150 may be disposed on the rotary arm 130. The horizontal compensation module 150 may allow the second portion S2 to radially move in accordance with the deployment of the solar panel S. Related description will be provided later.

The support module 140 may include a clamping member 142. The clamping member 142 may support and fix the second portion S2 by clamping the second portion S2 such that the second portion S2 floats from the ground at a height to which the first portion S1 is lifted.

Also, the support module 140 may be disposed between a point at which the second portion S2 is horizontally maintained and the rotary arm 130 (for example, the horizontal compensation module 150 connected to the rotary arm 130) in the direction of gravity, that is, perpendicularly to the ground.

The horizontal adjustment cable 160 may connect an upper portion of the rotary shaft 122 and the rotary arm 130 to prevent the rotary arm 130 from tilting.

Figure 4:
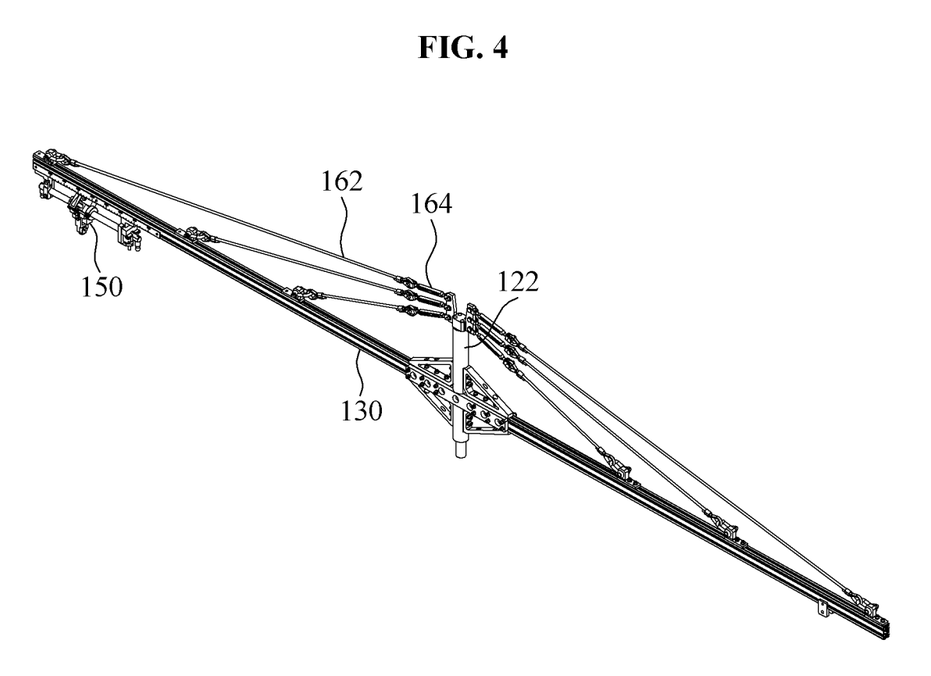
FIG. 4 illustrates a horizontal adjustment cable and a rotary arm of a deployment test apparatus according to an example embodiment.

FIG. 4 illustrates the horizontal adjustment cable 160 and the rotary arm 130 of the deployment test apparatus 100 according to an example embodiment Referring to FIG. 4, the horizontal adjustment cable 160 may include a wire diagonally connecting the rotary arm 130 and the upper portion of the rotary shaft 122, and a wire length adjusting member 164 to adjust a length of the wire 162.

The rotary arm 130 may be formed of a lightweight material and thus, may have a relatively low durability. Due to repetition of the deployment test of the solar panel S or a weight of the second portion S2, the rotary arm 130 may be tilted.

To prevent the tilting of the rotary arm 130, a force applied to the rotary arm 130 may need to be distributed.

The wires 162 may connect a plurality of points on the rotary arm 130 and an upper end of the rotary shaft 122 to provide a tensile force for preventing the tilting of the rotary arm 130.

The wire length adjusting member 164 that changes the length of the wire 162 may be disposed at one end of the wire 162. The wire length adjusting member 164 may be in a form of, for example, a turn buckle. The wire length adjusting member 164 may autonomously increase or reduce a length thereof to change a total length of the horizontal adjustment cable 160.

The wires 162 and the wire length adjusting members 164 may be connected to the plurality of points on the rotary arm 130 to prevent local tilting of the rotary arm 130.

Figure 5:
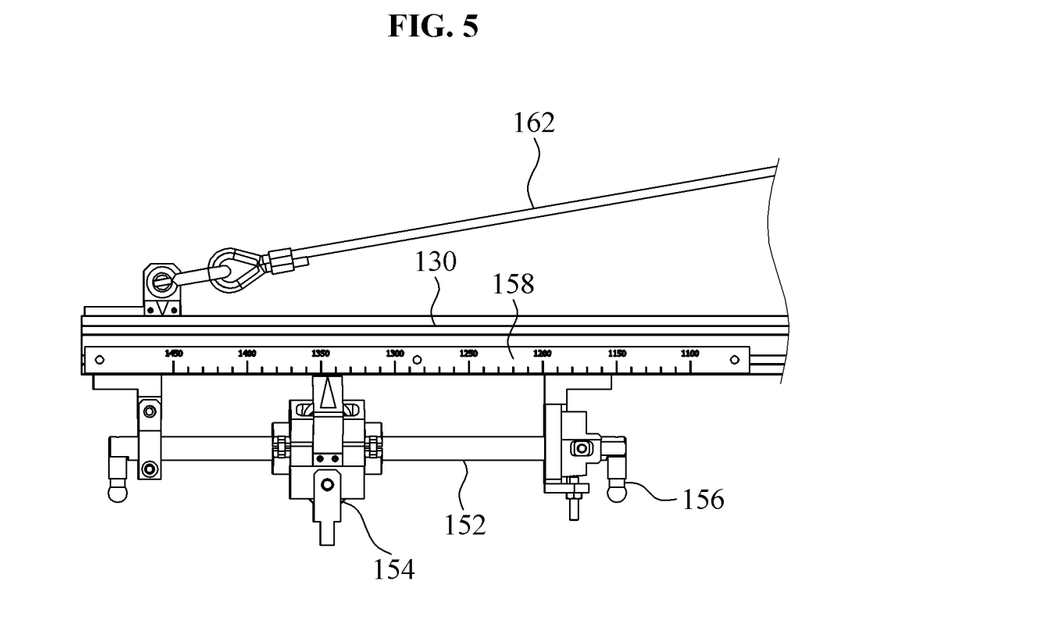
FIG. 5 illustrates a horizontal compensation module of a deployment test apparatus according to an example embodiment.

FIG. 5 illustrates the horizontal compensation module 150 of the deployment test apparatus 100 according to an example embodiment.

Referring to FIG. 5, the horizontal compensation module 150 may include a horizontal adjustment member 156 connected to a rotary arm, a guide bar 152 installed between the horizontal adjustment members 156, a horizontal bearing assembly 154 moving along the guide bar 152 and connected to the support module 140, and a horizontal scale 158 indicating a horizontal displacement of the support module 140.

The horizontal adjustment member 156 may be formed in a screw shape and adjust a vertical position of the guide bar 152. The horizontal adjustment member 156 may adjust a vertical position of one end of the guide bar 152 to adjust the level of the guide bar 152.

The horizontal bearing assembly 154 may horizontally move along the guide bar 152. The horizontal bearing assembly 154 may allow a horizontal movement of the support module 140. For example, in response to the solar panel S being deployed, the second portion S2 may radially extend. In this example, the support module 140 clamping the second portion S2 may horizontally move based on the horizontal compensation module 150. The horizontal movement of the support module 140 may be delivered to the horizontal bearing assembly 154, so that the horizontal bearing assembly 154 horizontally moves along the guide bar 152. That is, the guide bar 152 and the horizontal bearing assembly 154 of the horizontal compensation module 150 may allow a radial movement of the second portion S2.

The tape hinge S3 may be in a thin bar shape having an arcuate cross section in a width direction. When the solar panel S is folded, a middle portion of the tape hinge S3 may be folded. In this example, the folded middle portion of the tape hinge S3 may be changed from an arch shape to a flat shape. Also, the folded portion of the tape hinge S3 formed due to the folding of the solar panel S may be connected to the first portion S1 and the second portion S2 so as to protrude in a direction opposite to the folded portion, that is, a portion in which the arch shape is maintained, which may form a step. A diameter of the folded portion of the tape hinge S3 may be greater than a distance between unfolded portions of the tape hinge S3 connecting the first portion S1 and the second portion S2.

The step may increase a distance between a deployment axis of the first portion S1 and a deployment axis of the second portion S2 when the solar panel S is deployed. Thus, the second portion S2 connected to the first portion S1 by the tape hinge S3 may be moved in the radial direction.

The horizontal scale 158 may be installed toward the rotary arm 130. Also, an arrow may be marked on a surface of the horizontal bearing assembly 154. Thus, a displacement of the second portion S2 may be estimated based on a marking on the horizontal scale 158 indicated by the arrow of the horizontal bearing assembly 154 that moves based on a horizontal movement of the second portion S2.

Figure 6:
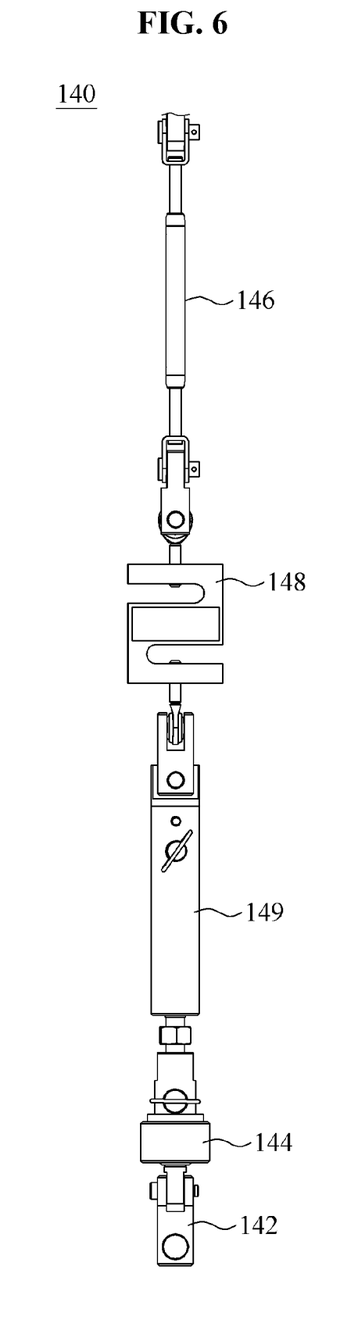
FIG. 6 illustrates a support module of a deployment test apparatus according to an example embodiment.

FIG. 6 illustrates the support module 140 of the deployment test apparatus 100 according to an example embodiment Referring to FIG. 6, the support module 140 may include the clamping member 142 that clamps the second portion S2, a rotation bearing 144 that allows a rotation of the second portion S2 in accordance with a deployment of the solar panel S, a length adjustable member 146 of which a length is adjusted to change a length of the support module 140, a weight sensing member 148 that senses a weight or a change in weight of the second portion S2, and a spring 149 that allows a vertical movement of the second portion S2 in accordance with the deployment of the solar panel S.

The clamping member 142 may be disposed at a lower portion of the support module 140 to clamp the second portion S2. The clamping member 142 may be disposed at a point at which the level of the second portion S2 is maintained without tilting. Also, the clamping member 142 may include a displacement scale 1422 to measure a displacement of the second portion S2 based on a deployment of the solar panel S.

Because the tape hinge S3 connecting the first portion S1 and the second portion S2 is formed of a flexible material, a fine vibration may be generated by a deployment shock or an actual trajectory of solar panel due to the deployment of the solar panel S. The generated vibration may be delivered to the second portion S2, so that the second portion S2 may be finely rotated about the support module 140 as a rotation axis. The rotation bearing 144 of the support module 140 may simulate an environment on an orbit by allowing the fine rotation of the second portion S2.

The length adjustable member 146 may be in a form of, for example, a turn buckle and precisely adjust a length of the support module 140. The support module 140 may be adjusted in length such that an elevation height of the first portion S1 corresponds to that of the second portion S2.

The weight sensing member 148 may be, for example, a load cell. The weight sensing member 148 may measure a weight of the second portion S2 or sense a vertical fine movement of the second portion S2 occurring in response to the solar panel S being deployed.

The spring 149 may attenuate the vertical fine movement of the second portion S2.

Figure 7A:
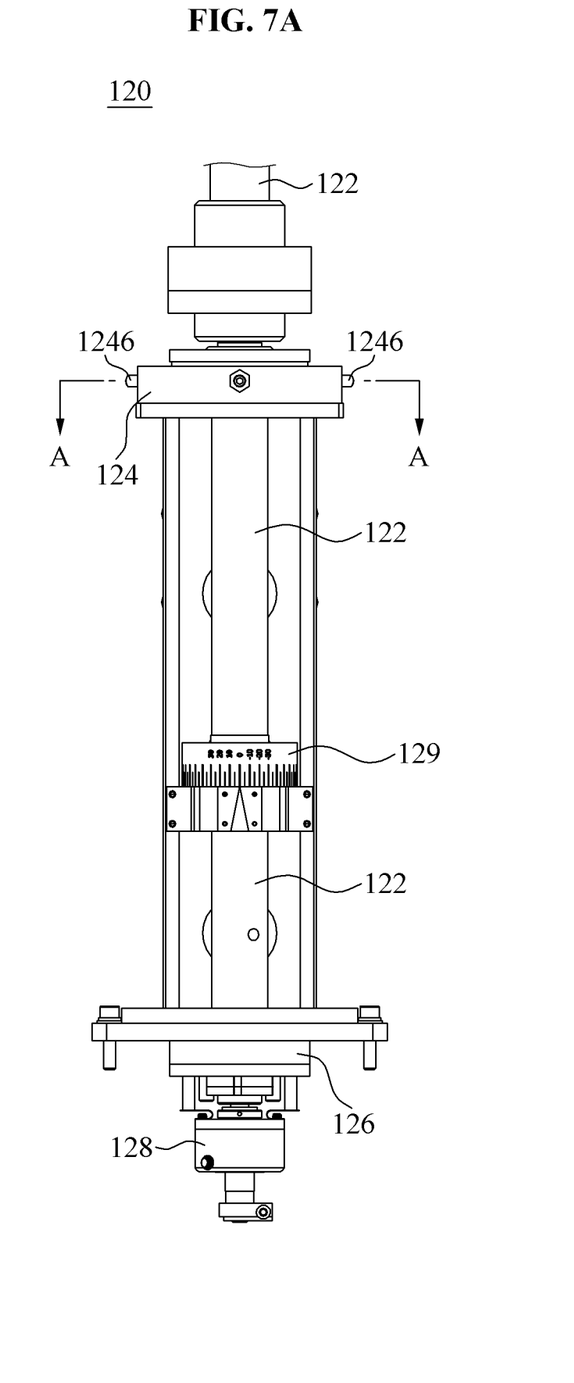
FIGS. 7A and 7B illustrate a rotation axis module of a deployment test apparatus according to an example embodiment.
Figure 7B:
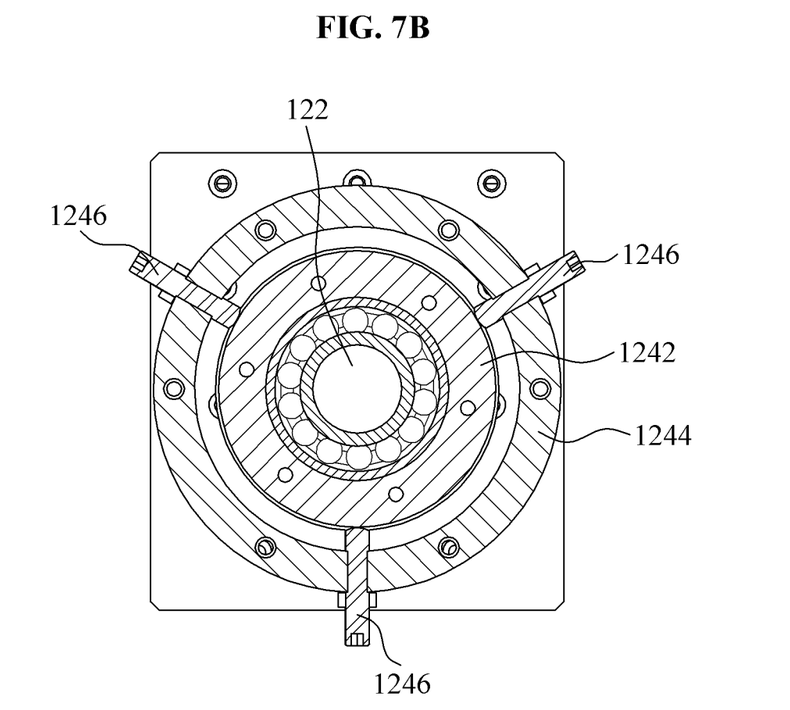

FIGS. 7A and 7B illustrate the rotation axis module 120 of the deployment test apparatus 100 according to an example embodiment.

FIG. 7A illustrates the rotation axis module 120 of the deployment test apparatus 100 and FIG. 7B is a cross-sectional view illustrating the rotation axis module 120 of the deployment test apparatus 100 taken along a plane A-A of FIG. 7A.

Referring to FIGS. 7A and 7B, the rotation axis module 120 may include the rotary shaft 122, a first self-aligning bearing 124, a second self-aligning bearing 126, a rotation sensing member 128, and a rotary scale 129.

The rotary shaft 122 may be rotated about the fixing frame 110 by a deployment force of the solar panel S which is sequentially transmitted through the support module 140 and the rotary arm 130. A center axis of the rotary shaft 122 may be located to be parallel with a deployment axis of the solar panel S to facilitate a deployment of the solar panel S.

The first self-aligning bearing 124 and the second self-aligning bearing 126 may be disposed to enclose the rotary shaft 122.

The first self-aligning bearing 124 may include a bearing element 1242 that encloses the rotary shaft 122 and allows a rotation of the rotary shaft 122, a housing 1244 disposed to be spaced apart from the bearing element 1242 to enclose the bearing element 1242, and a plurality of vertical adjustment elements 1246 arranged to penetrate the housing 1244 in a radial direction of the rotary shaft 122 such that the bearing element 1242 is spaced apart from the housing the housing 1244.

The plurality of vertical adjustment elements 1246 may be screwed to the housing 1244. For example, three vertical adjustment elements may be arranged at intervals of 120 degrees (°) in the radial direction of the rotary shaft 122. In this example, a position of each of the vertical adjustment elements may be adjusted to adjust a gradient of the rotary shaft 122 with respect to the fixing frame 110.

While the rotary shaft 122 horizontally moves in the first self-aligning bearing 124, the second self-aligning bearing 126 may enclose and fix the rotary shaft 122, so that the rotary shaft 122 is prevented from horizontally moving based on the second self-aligning bearing 126 as a fixed axis and adjusted in gradient with respect to the fixing frame 110.

The rotation sensing member 128 may be, for example, a rotary encoder and sense a quantity of rotation angle or an angular velocity of the rotary shaft 122.

The rotary scale 129 may measure a rotational displacement of the rotary shaft 122.

As described above, the deployment test apparatus may simulate a zero gravity environment of an orbit to improve an accuracy of a deployment test. Thus, the deployment test apparatus may accurately represent an actual trajectory of solar panel occurring when deploying a solar panel. Also, the deployment test apparatus may require a low manufacturing cost, be readily manufactured, have an increased mobility, and be installed with less restrictions on location for a test.

According to example embodiments, it is possible to provide a deployment test apparatus that improves a performance test accuracy of a solar panel deployment hinge by reducing an influence of gravity on the ground so as to simulate a zero gravity environment on an orbit.

According to example embodiments, it is possible to provide a deployment test apparatus in which an influence of air resistance is reduced so as to simulate a development motion of a solar panel on an orbit on the ground, thereby improving a performance test accuracy of a solar panel deployment hinge.

According to example embodiments, it is possible to provide a deployment test apparatus in which a performance test accuracy of a solar panel deployment hinge is improved by reducing an external force such as a mass or drag force of the deployment apparatus to simulate a deployment motion of the solar panel on an orbit.

According to example embodiments, it is possible to provide a deployment test apparatus for precisely predicting an actual trajectory of solar panel that occurs when a solar panel is deployed on an orbit.

According to example embodiments, it is possible to provide a deployment test apparatus having a rotary shaft configured to move in accordance with a deployment axis movement of a solar panel.

According to example embodiments, it is possible to provide a deployment test apparatus that requires a low manufacturing cost and is readily manufactured and installed with less restrictions on location for a test.

According to example embodiments, it is possible to provide a deployment test apparatus having a high mobility and ease of use.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A deployment test apparatus comprising:
   a fixing frame configured to fix a first portion of a target object in which the first portion is hingedly coupled to a second portion;
   a rotation axis module comprising a rotary shaft and disposed on one side of the fixing frame;
   a rotary arm radially extending from the rotary shaft in an upper portion of the fixing frame; and
   a support module connected to the rotary arm to clamp the second portion of the target object to be floated,
   a horizontal compensation module connecting the support module and the rotary arm, including a guide bar connected to the rotary arm and a horizontal bearing assembly connected to the support module and configured to move along the guide bar, wherein when deploying the target object, the deployment test apparatus is configured to reduce an external force applied to the target object.

2. The deployment test apparatus of claim 1, wherein the support module is moveable along the guide bar in a longitudinal direction of the rotary arm such that the second portion radially moves in response to the target object being deployed.

3. The deployment test apparatus of claim 2, wherein the horizontal compensation module further comprises a horizontal adjustment member configured to adjust the guide bar to be level.

4. The deployment test apparatus of claim 2, wherein the horizontal compensation module comprises a horizontal scale configured to indicate a displacement of the support module or the rotation axis module comprises a rotary scale configured to indicate a displacement of the rotary shaft.

5. The deployment test apparatus of claim 1, wherein the rotation axis module comprises a first self-aligning bearing, the first self-aligning bearing comprises:
    a bearing element configured to enclose the rotary shaft;
    a housing disposed to be spaced apart from the bearing element; and
    a plurality of vertical adjustment elements arranged to penetrate the housing in a radial direction of the rotary shaft such that the bearing element is spaced apart from the housing, and
    the vertical adjustment elements are configured to adjust a distance between the housing and the bearing element such that the rotary shaft is disposed in parallel to a gravity direction.

6. The deployment test apparatus of claim 5, wherein the rotation axis module further comprises:
    a second self-aligning bearing configured to enclose a lower portion of the rotary shaft to prevent a horizontal movement of the rotary shaft; and
    a rotation sensing member configured to sense a quantity of rotation angle or an angular velocity of the rotary shaft.

7. The deployment test apparatus of claim 1, wherein the support module comprises:
    a clamping member configured to clamp the second portion; and
    a rotation bearing configured to allow the second portion to rotate in response to the target object being deployed.

8. The deployment test apparatus of claim 1, wherein the support module comprises:
    a length adjustable member configured to be adjusted in length;
    a weight sensing member configured to sense a weight of the second portion; and
    a spring configured to allow the second portion to vertically move in response to the target object being deployed, and
    a length of the support module is adjusted based on a change in length of the length adjustable member such that an elevation height of the second portion of the target object is adjusted.

9. The deployment test apparatus of claim 1, further comprising:
    a horizontal adjustment cable configured to perform leveling to prevent the rotary arm from tilting,
    wherein the horizontal adjustment cable further comprises:
    a wire diagonally connecting the rotary arm and the rotary shaft; and
    a wire length adjusting member configured to adjust a length of the wire.

* * * * *